United States Patent [19]

Stenkvist

[11] Patent Number: 4,528,673
[45] Date of Patent: Jul. 9, 1985

[54] LADLE FURNACE WITH DC HEATING

[75] Inventor: Sven-Einar Stenkvist, Västerås, Sweden

[73] Assignee: ASEA Aktiebolag, Västerås, Sweden

[21] Appl. No.: 530,242

[22] Filed: Sep. 8, 1983

[30] Foreign Application Priority Data

Sep. 9, 1982 [SE] Sweden ................ 8205134

[51] Int. Cl.³ .............................. H05B 7/20
[52] U.S. Cl. ....................... 373/108; 373/85
[58] Field of Search ........... 373/85, 107, 108, 151

[56] References Cited

U.S. PATENT DOCUMENTS

| 1,562,825 | 11/1925 | Evreynoff | 373/107 |
| 4,149,024 | 4/1979 | Stenkvist et al. | 373/108 |
| 4,336,411 | 6/1982 | Hanas et al. | 373/60 |

Primary Examiner—G. P. Tolin
Assistant Examiner—Greg Thompson
Attorney, Agent, or Firm—Kenyon & Kenyon

[57] ABSTRACT

A metallurgical ladle furnace has a ladle for containing the melt, an arcing electrode positioned on the ladle's axis, and a melt electrode in the ladle's lower portion and substantially symmetric with respect to the arcing electrode. DC power applied to the electrodes results in an arc between the arcing electrode and the melt for heating the melt and incidentally causing the melt to stir in vertical directions, the melt moving downwardly in the middle below the arc, upwardly along the walls of the melt and inwardly towards the arc. A DC powered coil surrounds the ladle horizontally at half the ladle's height or higher, around the upper portions of the melt. The field of this coil in cooperation with a DC flow in the melt caused by the current flow between the electrodes, provides a substantially tangential stirring force on the melt which is in addition to the stirring force of the electrode current in the melt. This additional force results in the surface of the melt acquiring a concave shape surrounding the arc and protecting the ladle's wall from the arc flare while increasing the melt's energy absorption from the arc.

2 Claims, 1 Drawing Figure

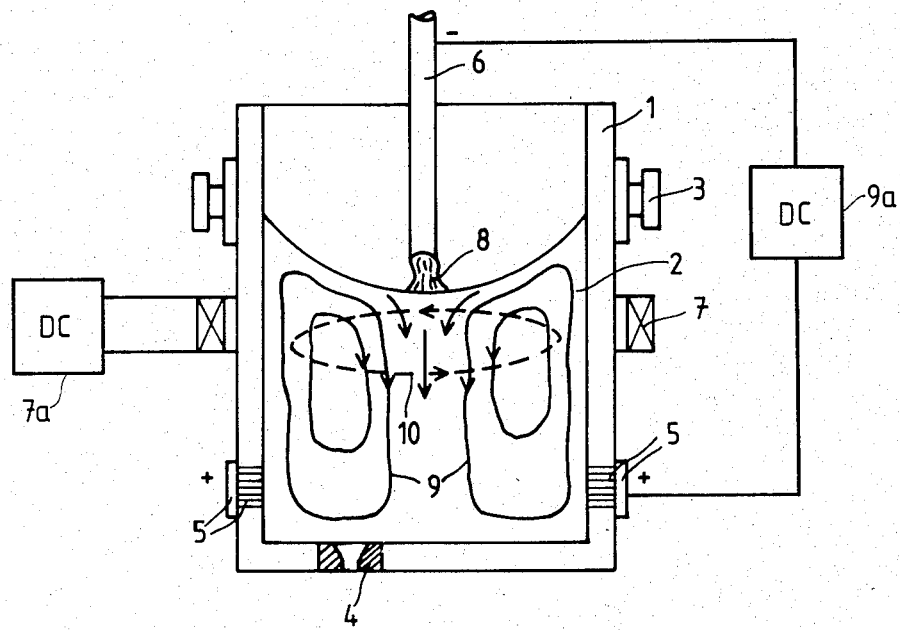

LADLE FURNACE WITH DC HEATING

BACKGROUND OF THE INVENTION

It is customary to pour a molten steel melt from its steel-making furnace into a ladle which is then carried to a casting location.

To keep the melt hot while it is in the ladle, possibly permitting final treatment of the melt, the ladle can be provided with a consumable arcing electrode positioned on the ladle's vertical axis with the ladle having a melt electrode in its bottom portion and normally symetrically disposed with respect to the ladle's axis and the arcing electrode. The melt electrode can be in the bottom of the furnace in alignment with the arcing electrode or more preferably in the form of an annulus extending around the ladle's wall closely above the ladle's bottom and concentrically around the ladle's axis symetrically with respect to the arcing electrode.

The ladle is then a ladle furnace. It is provided with DC arc heating by connecting DC power to the electrodes, with a DC power flow through the melt. Normally the arcing electrode is operated cathodically with the melt electrode providing the anode. When the melt electrode is in the form of the annulus mentioned, the current flow through the melt is substantially vertical but spreads symetrically from the foot point of the arc on the melt down to the annular melt connection in the lower part of the ladle wall, close to the ladle's bottom. When the melt connection is centrally in the bottom of the ladle the current flow is vertically between that melt electrode and the foot point of the arc.

The magnetic forces induced in the melt by the above current flow cause stirring of the melt in a generally vertical direction, the melt moving downwardly along the ladle's axis below the arc, upwardly along the wall of the ladle and inwardly towards the ladle's axis and along the melt's surface area.

BRIEF SUMMARY OF THE INVENTION

The object of the present invention is to provide the ladle's wall with protection against the flare from the arc so as to extend the service life of the ladle's wall lining, to make the arc operate more smoothly and to increase the energy absorption by the melt from the arc.

According to the invention a DC powered coil is horizontally positioned around the ladle so as to surround the ladle at or above half the ladle's height. Normally the ladle is filled with the melt to a height above half the height of the ladle and the coil should be positioned so as to surround the upper portion of the melt. A ladle normally comprises a steel shell lined with a refractory, and in this case the shell should preferably be made of non-magnetic metal so as to interfere with the coil's field as little as possible.

When the DC coil is adequately powered it provides a field in the melt which cooperates with the substantially vertical stirring flux induced by the current flow between the arcing and melt electrodes, so as to provide a tangential force in a generally horizontal plane in the upper portion of the melt, causing the melt to rotate around the axis of the ladle. This forms a vortex or concavity in the melt's surface with a rim portion rising above or at least partially above the arc. This protects the ladle wall lining from the arc flare while increasing the melt's arc energy absorption because an increased part of the melt's surface receives the arc flare. In addition the arc burns more smoothly because the melt's surface is less turbulent.

BRIEF DESCRIPTION OF THE DRAWING

The accompanying drawing schematically illustrates the foregoing, the single figure being a schematic vertical section of an example of this new ladle furnace.

DETAILED DESCRIPTION

In this drawing the ladle 1 can be assumed to have a non-magnetic shell lined with the usual refractory. The normal melt flow is indicated by the solid lines 2. The ladle is shown with the usual trunnions 3 and the bottom tap hole 4, the anodic melt electrode 5 being in the form of an annulus extending around the ladle's wall adjacent to the ladle's bottom and the consumable electrode 6 being shown vertically positioned on the ladle's axis with which the melt electrode 5 is concentric. The melt electrode 5 is symetrically disposed with respect to the arcing electrode 6.

The DC powered coil 7 is horizontally positioned so as to surround the ladle at a height at or above half the height of the ladle or, in other words, so as to be horizontally around the upper portion of the melt, the latter normally filling the ladle to somewhat above half its height. That is to say the coil 7 should be just a little below the level of the foot of the arc 8 formed between the electrode 6 and the melt.

Without the coil 7 the melt flowing forces induced by the symetrical flow of the current from the foot of the arc 8 to the anodic melt electrode annulus 5, is generally downwardly more or less vertically and causes the melt to flow centrally downwardly as indicated by the portion 9 of the solid lines 2, causing the melt to flow upwardly along the wall of the ladle and inwardly so as to flow downwardly again as indicated at 9. This occurs particularly when the schematically illustrated DC power source 9a is connected to operate the melt electrode 5 annodically and the arcing electrode 6 cathodically, which usually provides the smoothest possible arc formation. The melt surface is relatively flat and possibly turbulent.

The coil 7 is shown schematically powered by a DC power source 7a so as to project its field horizontally with respect to the previously described generally vertical field between the two electrodes. The fields cross or bisect so as to lead to a generation of forces which set the melt in rotation as indicated by the dashed line 10. This rotation is superimposed on the stirring indicated by the solid lines 2.

This rotation results in the melt's surface no longer being horizontal and generally flat, but concave as illustrated by the drawing. A vortex is formed in the melt's surface. The ladle's wall is protected from the flare from the arc 8 by the rim portion of the concave melt surface, while at the same time energy absorption by the melt is increased because that rim portion receives the arc flare. Energy absorption efficiency is increased and the ladle's refractory wall lining wear is decreased. The concave melt surface swirls relatively smoothly so that the arc burns relatively smoothly.

Calculations have shown that in a ladle with an inside diameter of 2 meters, there can be a difference in level of 500 milimeters between the melt's center and the outer edge of the melt when the melt's upper portion rotates half a turn per second. This is sufficient to in a practical way reduce the ladle's wall lining wear and increase the energy absorption of the melt.

What is claimed is:

1. A ladle furnace comprising a ladle containing a melt of molten metal up to a level at or above half the ladle's height, an arcing electrode positioned substantially on the ladle's vertical axis so as to form a heating arc with said melt in the ladle, a melt electrode positioned in the ladle's lower portion substantially symmetrically with respect to the arcing electrode, means for supplying the arcing and melt electrodes with DC power so as to cause a symmetrical flow of current vertically through said melt and between the arc and the melt electrode, a coil surrounding the ladle and positioned at or above half the ladle's height and below said level, and means for supplying the coil with DC power, said coil when powered by said means projecting a field through the melt horizontally with respect to said vertical flow of current so as to intersect said flow and cause said melt to rotate.

2. A method for operating a ladle furnace comprising filling the ladle with a molten metal melt up to a level above at least half the ladle's height, positioning an arcing electrode substantially on the ladle's vertical axis and above the melt's surface, supplying DC power to the arcing electrode, and symmetrically with respect to the arcing electrode to the lower portion of the melt by means of a melt electrode so as to form an arc between the electrode and the melt and heat the melt and so as to cause a vertical flow of current through the melt, and surrounding the ladle with a coil positioned horizontally at or above half the ladle's height and below said level and supplying the coil with DC power so as to cause the coil to project a field through the melt horizontally and intersecting said flow and producing a stirring force in the melt in a horizontally tangential direction.

* * * * *